Figure 1:
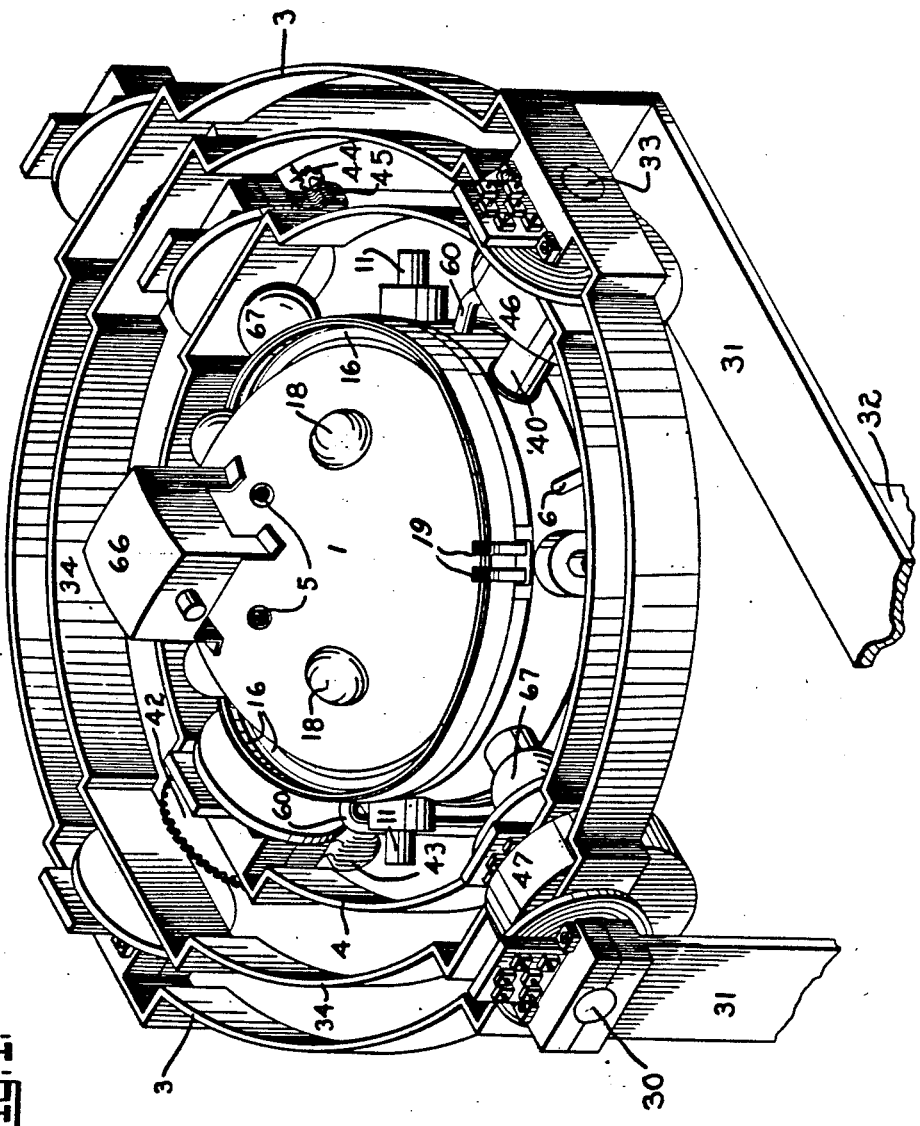

Jan. 22, 1946.　　　　M. JONES　　　　2,393,473
GYROSCOPIC NAVIGATIONAL DEVICE
Filed Feb. 9, 1942　　　5 Sheets-Sheet 1

Inventor
Meredith Jones
By Reynolds + Beach
Attorneys

Jan. 22, 1946.  M. JONES  2,393,473
GYROSCOPIC NAVIGATIONAL DEVICE
Filed Feb. 9, 1942  5 Sheets-Sheet 2
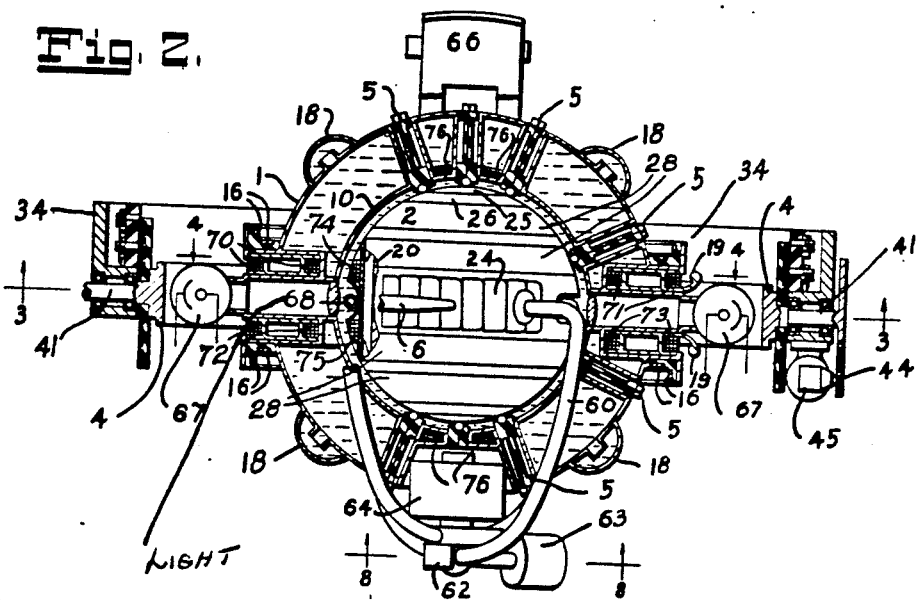
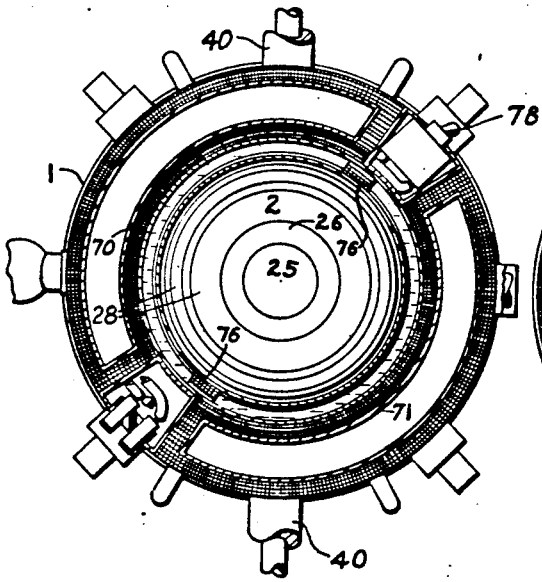
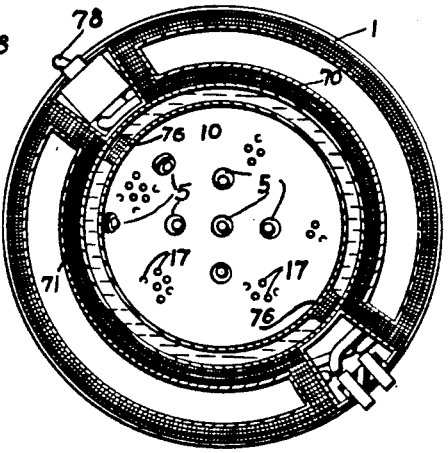
Inventor
Meredith Jones
By Reynolds & Beach
Attorneys Jan. 22, 1946.    M. JONES    2,393,473
GYROSCOPIC NAVIGATIONAL DEVICE
Filed Feb. 9, 1942    5 Sheets-Sheet 3
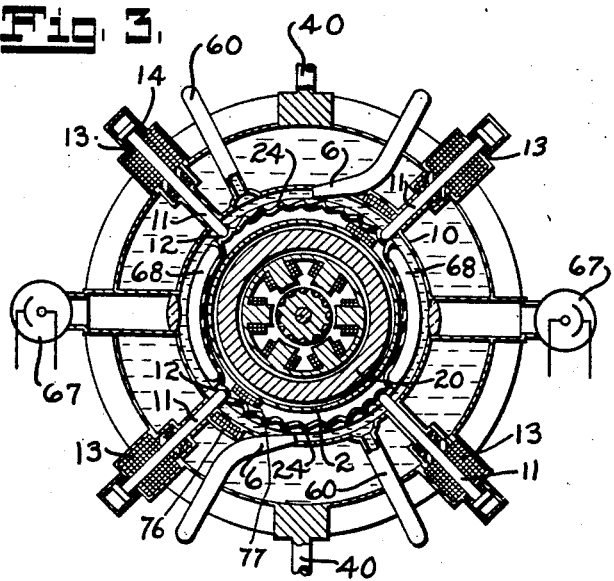
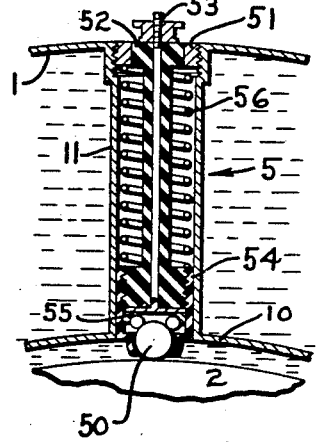
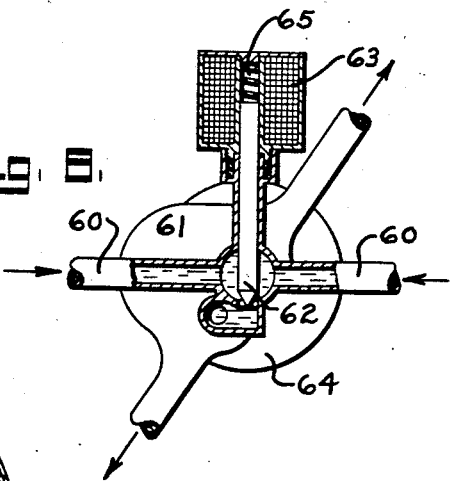
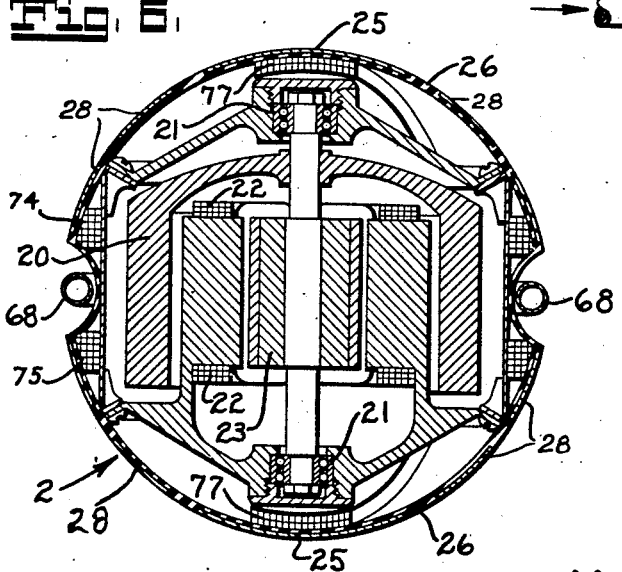
Inventor
Meredith Jones
By Reynolds + Beach
Attorneys Jan. 22, 1946.        M. JONES        2,393,473
GYROSCOPIC NAVIGATIONAL DEVICE
Filed Feb. 9, 1942        5 Sheets-Sheet 4
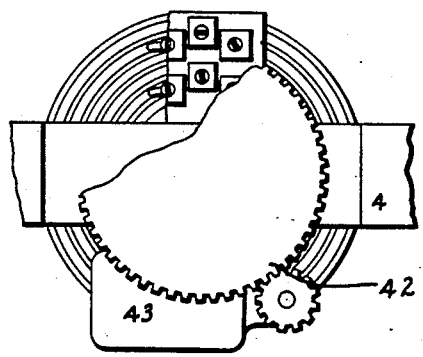
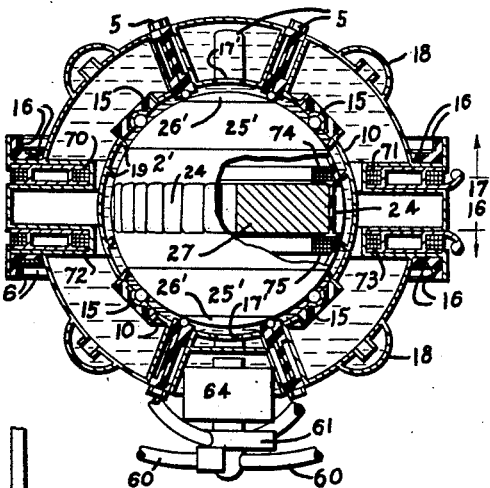
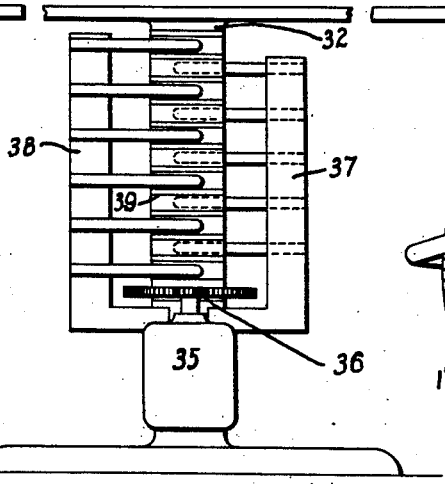
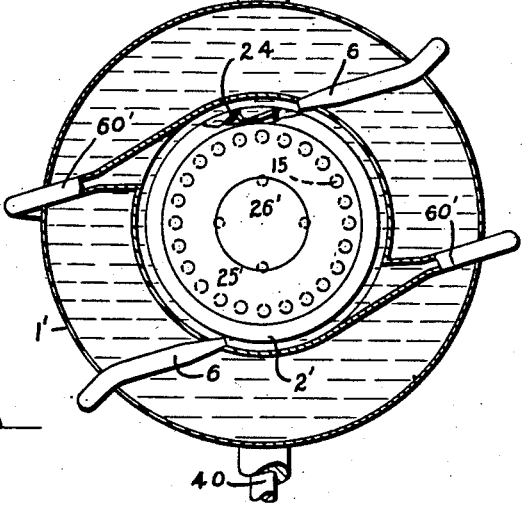
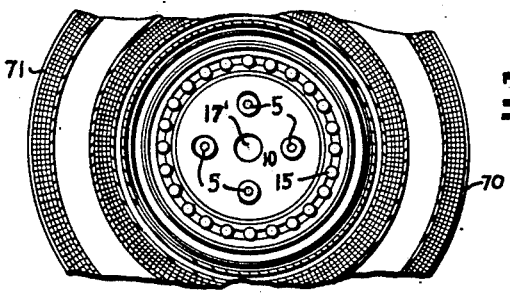
Inventor
Meredith Jones
By Reynolds + Beach
Attorneys Jan. 22, 1946.   M. JONES   2,393,473
GYROSCOPIC NAVIGATIONAL DEVICE
Filed Feb. 9, 1942   5 Sheets—Sheet 5
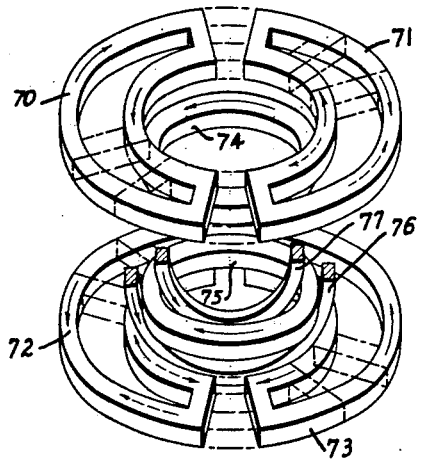
Fig. 11.
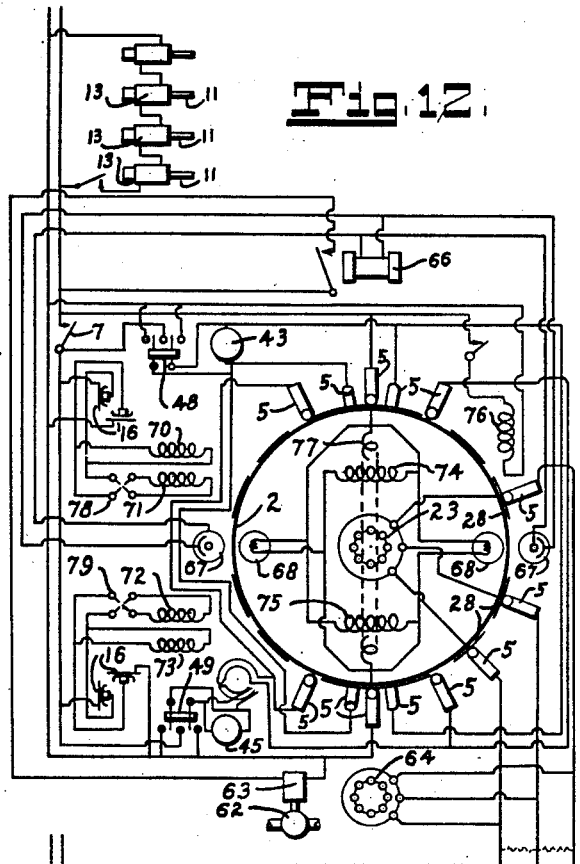
Fig. 12.
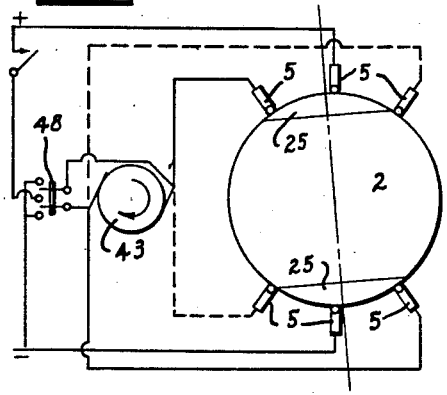
Fig. 13.
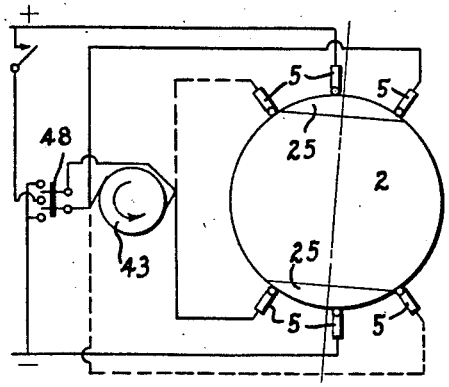
Fig. 14.
Fig. 15.
Inventor
Meredith Jones
By Reynolds & Beach
Attorneys Patented Jan. 22, 1946

2,393,473

UNITED STATES PATENT OFFICE 2,393,473

GYROSCOPIC NAVIGATIONAL DEVICE

Meredith Jones, Seattle, Wash.

Application February 9, 1942, Serial No. 430,165

38 Claims. (Cl. 74—5)

The subject of this invention is a navigational gyroscopic device which may be employed in the determination of the latitude and longitude of its position on the earth's surface, and may constitute drive mechanism for latitude and longitude indicating devices, or for an automatic course plotter, or both, such as disclosed in my Patent No. 2,354,917, issued August 1, 1944, for Position indicating mechanism, and my application Serial No. 430,167, filed February 9, 1942, for a Course tracing device, for example.

It is a well known principle of gyrodynamics that the rotative axis of a universally free, rapidly spinning gyroscope will maintain a constant spatial direction regardless of its relationship to the earth, provided it is not acted upon by disturbing influences which may cause it to precess, that is, which may tilt its rotative axis from its original direction. Thus, if the spin axis of such a gyroscope is established in a position parallel to the rotative axis of the earth, such parallelism will be maintained in whatever directions and to whatever extent the gyroscopic device may be moved about the surface of the earth. During such movement northward or southward from its original location, however, constituting a change in latitude, the inclination of the spin axis of the gyroscope with respect to the local horizontal plane, tangent to the earth's surface at such location, will change. Thus the angle between the gyroscope's spin axis and the horizontal will always correspond to the latitude of its position, and any change in such angle is a measure of the magnitude of the change in latitude, or latitude component, effected by progression of the gyroscopic device over the earth's surface.

If, however, the spin axis of the gyroscope is established in a plane at an angle to the earth's rotative axis, such as perpendicular to it, the angle between the gyroscope's axis and the local horizontal plane will change continuously, even in the absence of any shift in position of the gyroscopic device over the earth's surface. Such angularity change is produced by the diurnal rotation of the earth upon its axis, and consequently such change will occur about an axis parallel to the earth's axis. Since the rate of such temporal rotation is constant, however, the resulting change in angle between the spin axis of the gyroscope and the local horizontal plane will be at a constant and predictable rate. Upon such temporal change may be superimposed angular displacements relative to the horizontal plane caused by movement of the gyroscopic device over the surface of the earth. The variation in angular change in a plane perpendicular to the earth's rotative axis, whether increase or decrease, from that produced by the earth's diurnal rotation is a measure of the longitude shift of the device over the earth's surface. The tilt or dip of such plane of diurnal rotation relative to a horizontal line in the meridian plane corresponds to the latitude of the device's position.

While a single gyroscopic device having its spin axis in a plane perpendicular to the earth's rotative axis may, under ideal conditions, be used to measure both latitude and longitude changes, in my present mechanism I prefer that two gyroscopic devices be employed, one to indicate latitude components, and the other longitude components. One of these, in order to be affected only by a change in latitude, will be disposed with its spin axis parallel to the earth's axis. The other gyroscopic device will be responsive to changes in the longitude of its position and also will be affected by the diurnal rotation of the earth. The spin axis of its gyroscope will always lie in a plane perpendicular to the rotative axis of the earth, so that a change in the latitude of its position will alter the tilt or dip of such plane relative to a horizontal north and south line. This movement may be used as a check on the accuracy of operation of the latitude gyroscopic device. Since any departure from the constant angular displacement between the spin axis of the longitude gyroscope and a horizontal plane caused by the earth's rotation will be evidence of a progression in the longitude of its position, this departure may be utilized to govern longitude indicating or plotting mechanism, such as described more fully in my copending applications mentioned above.

Having now determined the theoretical requirements for latitude responsive and longitude responsive gyroscopic devices, I may direct attention to a construction suitable for accomplishing the described operation. Since, in each instance, the attitude or relationship of the gyroscope's axis is to be measured with respect to a local horizontal plane, each gyroscopic device should be mounted in a Cardan's suspension, or gimbal ring support which will maintain the structure more directly supporting the gyroscope in a constant relation to such plane despite rolling or pitching of the ship or vehicle in which it is mounted.

The heart of the gyroscopic device carried by the gimbal ring support, whether it be of the latitude or longitude type, is a universally free gyroscope, which must be mounted, spun, and controlled, so that its spatial relationship will be affected by outside influences to as small an extent as possible. A principal difficulty with such devices heretofore has been that disturbing factors, such as friction, unbalanced masses, and drive mechanism, have destroyed the constancy of the spatial relationship of the gyroscope's axis, and consequently the accuracy of its operation. My mechanism is virtually free of such errors, and in addition I can detect precessional departures from the original orientation and exert a force which will counteract or balance the disturbing force, to eliminate future inaccuracies.

In order to minimize disturbing influences which might cause the gyroscope to precess, it constitutes, or is mounted in, a sphere or ball suspended within a casing by fluid in a wholly unrestrained manner. Although the gyroscope ball is confined within the casing, there is no positive interconnection between them, ball bearings engaging opposite sides of the ball to maintain it in a central location. Since the ball may freely move universally within and relative to the casing, I shall refer to them as being mechanically connected. Actually no great displacement of the gyroscope ball and casing takes place, because mechanism is provided to move the casing as relative movement between the gyroscope and the gimbal support occurs, to restore the prior relationship between the casing and ball.

Thus the entire ball may be rotated as the gyroscopic element, being balanced about its rotative axis, or the ball may house, sealed within it, a gyroscope rotor, such rotor and the other mechanism within the ball being balanced about the rotor's axis so that the center of gravity of the sphere coincides with its geometrical center.

If the entire ball is to serve as the gyroscope, a fluid turbine, utilizing the fluid with which the casing is filled, may be used to rotate it. If the gyroscope is sealed within the ball, however, its driving unit must also be thus housed, and an electric motor may be enclosed within the gyroscope sphere, having its armature directly connected with the gyroscope rotor. Current for the motor is supplied through bearing members engaging conductors on the ball. Even after the gyroscope rotor has been brought up to speed some reaction to its rotation will be exerted on the ball, tending to rotate it oppositely. Unless this tendency were counteracted the gyroscope effect would be greatly decreased. Rotation of the ball relative to the casing about the gyroscope's spin axis may be counteracted, without adversely affecting its universally free characteristics, by a similar fluid turbine arrangement automatically controlled for intermittent operation, to maintain the ball in a substantially constant rotative relationship to the casing. Alternatively, electric centering coils may be adapted for this purpose in certain types of installations.

Having provided a suitable mounting and gyroscopic element, the next problem is to orient its spin axis properly with relation to the earth, depending upon whether the gyroscopic device is to be responsive to latitude changes, or longitude changes, or both, and to maintain such spatial relationship of the axis until the desired operating conditions have been established. Thereafter it is merely necessary to translate the changes in relationship between the spin axes of the gyroscopes and the local horizontal plane into corresponding indications of latitude and longitude, or course traveled.

In order to control positively the relationship of the gyroscope sphere to the casing within which it is sealed, electric control reaction coils incorporated in the casing coact with corresponding coils in the ball to create a torque about any desired axis perpendicular to the spin axis of the gyroscope, and with any required force to tilt the ball and casing relative to each other. While the coils within the ball may be fixed and may carry a current of constant direction and intensity, the coils in the casing surrounding the ball may be movable, and the direction and intensity of current flowing through them may be controlled, to react with the gyroscopic ball coils, for producing a centering force, or a regulated precessing torque. In addition, cooperating centering coils may be located diametrically of the ball and casing, perpendicular to the other coils, for rotating the ball within the casing substantially about the spin axis of the gyroscope. Holding pins, mechanically interengageable between the casing and the ball, may be reciprocated inward to lock the ball in a position with these coils in coplanar disposition.

Although the spin axis of the gyroscope maintains a constant spatial relationship, in a latitude gyroscopic device of the type mentioned its attitude with reference to the gimbal ring support will be changed by a shift in latitude. Similarly the relationship of a longitude gyroscopic device relative to the gimbal ring support will be altered, about one axis by a change in longitude, or by the effect of the earth's rotation, or both, and about an axis perpendicular to the first axis by a change in latitude. Indicating or recording mechanism, or both, may be driven by and coordinated with the movement of each such gyroscopic device relative to its gimbal ring support.

The casing for the gyroscope sphere is supported from the gimbal ring mounting, and hence any tendency of the mounting to move with respect to the gyroscope will tend to produce a like change of the casing relative to the gyroscope ball. Such tendency may be converted into a movement of the casing with respect to the gimbal ring mounting sufficient to maintain the relative disposition of the gyroscope ball and casing constant. The tilt of the casing relative to the mount will thus reflect the mount shift relative to the gyroscope, so that such tilt serves as a measure of gyroscope progression. To utilize this follow-up action a controlled universally rotative carrier is interposed between the leveling gimbal mounting and the casing, which carries drive mechanism to move the casing relative to such gimbal mounting in response to displacement of the latter relative to the gyroscope ball. Such drive mechanism will be operated to swing the casing universally, if necessary, to continually follow-up movement of the gyroscope. To eliminate any detrimental effect of friction I prefer that the casing be in a constant state of oscillation of small amplitude with respect to the gyroscope ball, while maintaining substantially a constant interrelationship.

This follow-up movement of the casing may be utilized to drive the indicating and recording devices, the transmitting mechanism compensating for the oscillation of the casing and the portion of its movement effected by diurnal rotation of the earth, so that only the absolute movement of the gyroscope device caused by a shift in latitude or longitude will finally be indicated or recorded.

The accuracy of operation of a gyroscopic indicating or recording device of the type which I have developed depends in a large measure upon the accuracy with which the spin axis of the gyroscope remains oriented in space. It is thus a primary consideration to eliminate outside influences as far as possible, and to provide mechanism to exert a restoring force for correcting the direction of the spin axis while the gyroscope is in motion, if it should fall into error, and to apply a force thereafter counteracting very exactly, both in direction and magnitude, the resultant disturbing force, so that the tendency to precess from proper orientation is eliminated. The reaction coils mentioned may afford such regulation.

Various details of structure will be described more specifically hereafter in connection with the particular purpose for which they are provided. It will further be evident that different features may be modified as a matter of choice, or to adapt my mechanism to particular uses, while employing the same principles of construction and operation within the spirit of my invention. The devices shown in the drawings, however, are representative embodiments of my mechanism.

Figure 1 is a top perspective view of my mechanism in general.

Figure 2 is a central section through the gyroscope device omitting the outer gimbal ring structure and showing the gyroscope sphere in elevation, while Figure 3 is a central transverse section of the gyroscope unit along line 3—3 of Figure 2. Figure 4 is a further transverse section of such unit taken along line 4—4 of Figure 2, showing the gyroscope ball in plan. Figure 5 is a sectional view along line 4—4 of Figure 2 viewed in the direction opposite Figure 4 and with the ball omitted.

Figure 6 is longitudinal section taken through the gyroscope sphere by itself. Figure 7 is a detail section through the mounting structure of a bearing contact for the ball. Figure 8 is a detail sectional view of a portion of the mechanism taken along line 8—8 of Figure 2. Figure 9 is a detail elevation view of casing drive mechanism and conductor rings showing parts broken away. Figure 10 is an elevation view of the supporting and electrical energy supply structure for my device.

Figure 11 is a diagrammatic top perspective view of the reaction coil arrangement. Figure 12 is a circuit diagram of the electrical portion of my mechanism, and Figures 13 and 14 are partial circuit diagrams, illustrating the operation of the casing follow up mechanism.

Figure 15 is a longitudinal section similar to Figure 2 through a modified form of my gyroscope unit. Figure 16 is a transverse section through the unit shown in Figure 15, taken along 16—16 of that figure, showing the gyroscope sphere in plan. Figure 17 is a section through the unit of Figure 16 taken along line 17—17 of that figure, with the inner ball removed.

Figure 18 is a wiring diagram of the form of my device shown in Figures 15 to 17, inclusive.

The general construction of the gyroscopic device of my mechanism, as shown in Figure 1, includes a casing 1 housing the gyroscope sphere or ball 2, and is supported by a Cardan's suspension or leveling gimbal ring mount. The casing is supported from the Cardon's suspension by a controlled, universally rotative carrier. The outer gimbal ring 3 is pivoted at 30 upon a yoke 31 which is supported for rotation by a post 32. Perpendicular to the axis of pivots 30, trunnions 33 support the inner gimbal ring 34. Thus, the sides of this ring 34 adjacent to pivots 30 will always define a horizontal line. Upon and between these portions of ring 34 is journaled the controlled, universally rotative carrier, including a ring 4 which is rotatable about pivots 41 defining an axis always disposed parallel to the above-mentioned horizontal line, but spaced below pivots 30 and 33. The center of gravity of the gyroscopic unit will always be in the axis of pivots 41, and hence below the intersection of the axes of pivots 30 and 33, to provide a pendulum effect. This arrangement assures that the portions of ring 34 adjacent to pivots 30 will always seek a level position. Within the ring 4 is journaled the casing 1 on trunnions 40, whose axis is perpendicular to the axis of pivots 41 about which ring 4 swings.

Movement about these latter two axes is not free, for reasons to be described hereafter, but the casing 1 is mechanically entrained with ring 34 by two follow up drives. One is composed of reduction gear mechanism 42, driven by motor means 43 incorporating further reduction gearing or worm and pinion transmission interengaged between the casing and ring 4 for restraining their relative movement when the motor is de-energized and for effecting their relative swinging upon trunnions 40 when the motor is energized. The other follow up drive consists of reduction gear mechanism 44, actuated by motor means 45 similar to 43, and interengaged between ring 4 and ring 34 for restraining their relative movement when the motor is deenergized and for effecting their relative swinging about pivots 41 when the motor is energized. With respect to yoke 31, therefore, the casing 1 of the gyroscopic unit has two distinct types of movement, one afforded by the freely tiltable Cardan's gimbal mount, functioning as leveling mechanism, and the other by the controlled, universally rotative carrier. Relative movement of the latter supporting structure is effected and restricted by the positively interengaged drive mechanism mentioned. Its operation is controlled by or in response to displacement of ring 4 relative to the gyroscope, to maintain such ring always substantially parallel to the equator in the case of the latitude gyroscope, and in the case of the longitude gyroscopic unit to maintain pivots 40 always parallel to the earth's rotative axis and the axis of pivots 41 directed east and west, yoke 31 always being maintained in an east and west direction for such application of the gyroscope, and preferably also in the case of the latitude gyroscope, as described hereafter.

The general construction of casing 1 and the manner in which it is mounted are the same for both forms of gyroscopic units to be described in detail. Both gyroscopic units are of the universally free type and include an unconstrained sphere housed concentrically within the casing. Such casing may be separable at its central plane or equatorial zone for installation or replacement of the sphere, or, after the ball has been put in place, the casing halves may be permanently joined together, as by welding.

One type of gyroscope unit, which is shown in Figures 2 to 6, inclusive, comprises the sphere 2 which is suspended centrally within the casing 1 in a fluid medium, preferably a liquid, which may be oil, or a mixture of glycerine and water, for example. For ideal conditions the specific gravity of such suspension liquid should be adjusted so that the weight of liquid displaced by ball 2 will be equal to its entire weight. Practically such a relationship is not feasible, but the ball is made largely hollow, as shown in Figure 6, so that the centering bearings 5 are relieved of a substantial portion of its weight. With less effectiveness, air or other gas, under pressure, may replace the liquid to serve a similar function.

In this form of gyroscope the hollow sphere is intended to maintain a substantially constant position, and the gyroscopic effect is produced by spinning a massive rotor 20 journaled within the sphere in antifriction bearings 21. The rotor is driven by a motor which may be powered either by direct current or by alternating current, but which preferably is of the three-phase, alternating current, squirrel cage type, including stator coil 22, and an unwound armature 23 integral and concentric with the gyroscope rotor. The bearings 21 may be lubricated in any suitable fashion, such as by wicks fed from an oil reservoir, or by lubricant impregnated packing material. Because the sphere 2 is tightly sealed, I prefer to provide a neutral gaseous atmosphere within it, such as hydrogen or helium, which will have no detrimental effect upon the lubricant or insulation of the motor winding, and no appreciable resistance to rotation of the gyroscope rotor 20.

In order to center the gyroscope sphere 2 within the casing 1, oppositely arranged clusters of bearing units 5, extending radially through the casing 1, and each having a bearing ball 50 at its inner end, may engage opposite sides of the inner ball. The construction of these bearing units is shown in detail in Figure 7 as including an outer collar or ring 51 threaded into the outer end of a tube 11 which interconnects the skin of casing 1 with the inner casing wall 10, such wall being spaced only slightly from the gyroscope ball 2. Slidably received within collar 51 is a rod of insulating material, through the center of which extends a conductor 53. The inner end of this rod is secured within a sleeve 54, also of insulating material, such as by a threaded connection. This sleeve has a snug sliding fit within tube 11, and its inner end is formed as a ball-retaining socket for bearing ball 50. In order to provide free rotation of this ball, a small annular ball bearing ring 55 may be housed within sleeve 54 between the inner end of rod 52 and bearing ball 50. Ball 50 further serves as an electric terminal for conducting current to the gyroscope sphere, being in circuit with conductor 53 through bearing ring 55 which seats against a plate attached to the conductor. The effectiveness of ball 50 as a bearing is preserved by a helical, compression spring 56 which encircles a reduced portion of rod 52, and reacts between the fixed collar 51 and the slidable sleeve 54 or the end of rod 52 embedded in it. Ball 50 is thereby continually urged inward against the gyroscope ball 2.

Even after the gyroscope ring 20 has been brought up to speed by its driving motor 22, 23, there will be some reaction upon the parts of the ball not intended to be rotated, caused by the slight friction of bearings 21. As the gyroscope rotor is rotated at constant speed in one direction, therefore, the ball would rotate in the opposite direction, at first slowly and then gradually picking up speed, until the absolute rotation of the gyroscope rotor 20 had been substantially decreased. In order to prevent this occurrence, the casing 1 carries self-contained mechanism for applying an intermittent, or possibly continuous, force counteracting the tendency of the ball 2 to rotate, so that it has merely a gentle oscillating motion back and forth. This mechanism may comprise a jet of the fluid contained in the casing 1 projected by a nozzle to impinge against buckets 24 formed on the equatorial portion of the sphere. Preferably the driving fluid is a liquid, but if the casing is gas-filled a jet of gas, such as compressed air, would supplant the liquid for propulsion purposes.

An intake 60 for the driving fluid is preferably spaced circumferentially slightly beyond each nozzle 6, so that after the greater portion of the jet energy has been expended on the buckets the fluid will pass into the intakes with a minimum of turbulence created within the casing and with some initial velocity. From the intakes the fluid passes to a pump 61, past a control valve 62, which may be operated by a solenoid 63. The pump is driven continuously by a motor 64 received in a cavity formed in one side of the casing 1. The control valve 62 may be mounted on the motor housing, but it must be disposed and proportioned relative to ring 4 so that it can pass through the ring as the casing rotates about its pivots 40. While only one nozzle and one intake would be sufficient ordinarily to maintain the gyroscope ball in a position of equilibrium, at least two intakes and nozzles, as shown, are preferred to balance the weight and torque forces, and to maintain the restoring jet action even though one of the intakes or discharge pipes should become clogged to a greater or less extent.

The friction of the gyroscope bearings 21 is very slight and consequently it would be difficult to regulate the flow of liquid through nozzles 6 so that their force would always precisely balance the reaction to rotation of the gyroscope which causes the retrograde motion of ball 2. It might be thought that adjustment of the nozzle flow could be made so that approximately the proper force would be applied to turbine buckets 24, for it would not matter if the ball 2 turned slowly in one direction or the other. The difficulty, however, is that with slightly unbalanced forces applied to the ball 2, its rate of rotation would gradually increase in the direction of the unbalanced force, whether reaction or propulsion, at a rate depending upon the size of such force. I therefore provide a positive control over the action of jets 6 so that the ball 2 will not revolve completely in either direction, but will oscillate back and forth.

In order to effect such control over the rotation of ball 2, the jets, instead of being minute and flowing continuously at a low velocity, are operated intermittently as the occasion for, and to the extent that, application of a restoring force becomes necessary from time to time. This intermittent operation is accomplished by transient energization of the solenoid 63 to open valve 62. Normally this valve is held in closed position by the spring 65, shown in Figure 8. The solenoid is energized by operation of a relay 66 which is mounted on the casing preferably at the side opposite pump 64 and valve 62. The relay housing also must be of a size and shape such that it can pass through ring 4 as casing 1 is rotated upon its pivots 40. The pump system and relay are thus arranged so that they tend to balance each other, and the other mechanism is mounted on and in the casing in positions such that the center of gravity of the whole casing assembly substantially coincides with the geometrical center of the casing.

Energization of the relay is effected by photo-sensitive devices 67, such as photo-electric cells, focused upon a source of light which may take the form of tube lights 68 carried in grooves around the equatorial region of the ball 2 over an appreciable arc. Preferably two photo-electric cells, at opposite sides of the casing, are employed, and the ball carries two lights 68, one on each side, arranged between groups of turbine buckets. Either photo-electric cell will actuate the relay 66 to energize valve solenoid 63, but where two systems are provided one of the lights 68, or a photo-electric cell 67, may fail without incapacitating the mechanism.

As the reaction of the motor spinning the gyroscope rotor 20 initiates rotation of ball 2 in the opposite direction, we may assume that the tube lights are out of registry with the photo-electric cell windows. With the ball in this rotative position, the solenoid 63 will be deenergized and valve 62 will be closed, so that although pump 61 may be rotated continuously by motor 64 no liquid will be discharged from nozzles 6. As such rotation of ball 2 continues, however, lights 68 will move across the photo-electric cell windows to energize such cells, which will create a current through the photo-electric cell circuit. The particular manner in which the photo cells cause relay 66 to close its switch in the circuit of solenoid 63 is not important, and for purposes of illustrating the desired action we shall assume that the current generated by the photo-electric cells themselves is sufficient to actuate relay 66 to close such switch. Valve 62 will thereupon be raised from its seat and fluid from within the casing I will be discharged by pump 61 through nozzles 6 against turbine buckets 24, first to stop retrograde rotation of ball 2, and then to rotate it in the direction opposite that in which it was rotated by the gyroscope reaction.

Such operation of the jets will continue until the ball has been rotated an amount sufficient to move lights 68 out of registry with the windows of photo-electric cells 67. Their circuits will thereupon be immediately deenergized, in turn interrupting the current through solenoid 63, so that valve 62 will be closed by spring 65 to intercept the flow through jets 6. With the jets thus inoperative, the dynamic inertia of the ball 2 will gradually be counteracted by the reaction force of the gyroscope, so that it will cease to rotate in the direction driven by the jets. When the sphere has stopped it will again be turned in the opposite direction by the continued reaction of the gyroscope until the lights 68 move once more into registry with the windows of photo-electric cells 67. Solenoid 63 will thereupon be energized again to initiate operation of jets 6 for once more reversing the direction of ball rotation.

The tube lights 68 should extend over an arc sufficient that the solenoid 63 will hold valve 62 open long enough for the jets to stop retrograde rotation of the sphere before the lights pass out of registry with the photo-electric cells, and thereby effect closing of the valve. Otherwise, while the reaction rotation of sphere 2 will be retarded, it will not be stopped, but will gradually increase in speed. Such over-running in a retrograde direction can be corrected by slightly increasing the jet force. On the other hand, the arc over which the lights extend should not be so great that, with the type and force of jets used, the rotative inertia of the sphere created by the jets will carry a light from one photo-electric cell window into registry with the next such window, in the direction of rotation of the gyroscope. In such event the photo-electric cells would again initiate operation of jets 6, to continue and to accelerate rotation of the ball in such direction. In either instance the rotation of the sphere would become continuous in one direction or the other, and the speed of such rotation would increase progressively.

As shown in Figure 3, the alternate light and bucket zones may each occupy approximately a quarter of the sphere's girth. The jet force will then be regulated so that the back and forth oscillation of the ball will not exceed 180 degrees where two photo-electric cells and jet systems are used, and preferably will be through an angle of approximately 90 degrees. The gyroscopic action of the rapidly rotating rotor 20 will thus not be affected adversely.

The Cardan's suspension of casing I from ring 34 tends to maintain trunnions 41, supporting ring 4, in a horizontal position. A universally free gyroscope normally maintains a constant spatial relationship. A change in the relative position of the gyroscope's spin axis and the axis of pivots 41, therefore, denotes a change in spatial position of the gyroscopic device, which may be caused either by its movement over the surface of the earth, or by the diurnal rotation of the earth upon its axis, or both, depending upon the orientation of the gyroscopic spin axis and of the pivot axis. If the casing I is motivated to maintain a definite relationship between it and the gyroscope element at all times, any departure of the gyroscope spin axis from its initial relation to that horizontal axis will be reflected in a corresponding movement of casing I relative to such line.

The casing may move about either one of two axes, defined by pivots 40 and by pivots 41, respectively, relative to ring 34. Position on the surface of the earth is usually designated by rectangular coordinates of the location measured in terms of latitude and longitude components. It is therefore convenient to dispose the gyroscopic device so that a latitude departure will result in movement of the casing about only one of these sets of pivots, while a longitude change will cause movement only about the other set of pivots.

In order to orient the device so that the above effect will be produced, the axis of one set of pivots, for example 40, should always be maintained in a meridian plane, while the other set of pivots will necessarily always be perpendicular to the first set. Whether the device is to be used for the measurement of latitude or longitude, therefore, the axis of pivots 40 may be thus controlled by orientation of yoke 31 perpendicular to the meridian, that is, in an east and west direction. This alignment may be preserved by controlling movement of post 32 by a motor 35 and gear train 36 incorporated in the repeater system of a gyro-compass.

If movement of the casing I, relative to ring 34, is to duplicate similar relative movement of such ring to the gyroscope sphere 2, the casing cannot move freely upon pivots 40 and 41, but rather such movement must be dictated by a tendency of such sphere and casing to be displaced relatively. It is therefore necessary to provide a mechanical interconnection between casing I and ring 4 through the gear train 42, and between ring 1 and ring 34 through the gear train 44, as previously described. Movement of these gear trains is accomplished by motor means 43 and 45, respectively, whose operation must be responsive to movement of the support ring 34 and mechanically interconnected casing 1 relative to the gyroscope element 2.

The follow-up motor control mechanism utilized for this purpose incorporates the clusters of bearing contacts 5 engaging opposite sides of the sphere 2. Each cluster consists of five contact units, including a central contact of one polarity and the other four, of opposite polarity, distributed about the central member equidistant from it and spaced circumferentially at equal intervals. Two of the off-center contact members at each side of the casing on opposite sides of the central contact will be disposed in a plane including the axis of pivots 41, as shown in Figure 2, and the other two opposite off-center contacts at each side of the casing will lie in a plane including the axis of pivots 40, and disposed perpendicular to such first plane, as shown in Figure 1.

By movement of the casing 1 a line joining the centers of the circles defined by the off-center contact members 5 will be shifted to substantially coincide at all times with the spin axis of the gyroscope element. To accomplish such follow-up movement of the casing the encircling contacts 5 are all connected in a circuit of either motor 43 or 45, as shown in the circuit of Figures 12, 13 and 14. Thus the four off-center contacts 5 defining the plane including pivots 40 will control operation of motor 45 in driving gear train 44 to rock casing 1 about the axis of pivots 41, perpendicular to such plane. Similarly, the four off-center polar contacts 5, shown in Figure 2 and located in the plane of pivots 41, will control operation of motor 43 to swing the casing 1 about the axis of pivots 40 perpendicular to such plane. The off-center contacts 5 in each polar region are arranged about the circumference of a circle of radius sufficient that when the spin axis of the gyroscope exactly coincides with a line joining the centers of these contact circles, such contacts will all be just beyond the edge of metal polar contact caps 25 on the gyroscope sphere, and will engage the ring of insulating material 26 immediately surrounding these metal caps. The arrangement of these contact zones and balls is shown structurally in Figures 2, 4 and 5, and diagrammatically in Figures 13 and 14.

If a change in the relationship of the earth to the gyroscopic device occurs to change the tilt between the gyroscope spin axis and a horizontal plane represented by ring 34, the casing 1, positively geared to such ring, will move relative to the gyroscope sphere until contact is made simultaneously between diametrically opposite off-center contacts 5, in the manner shown in Figure 13, for example. A circuit will thus be completed between the two central polar contacts, of opposite polarity, through one of the motors, such as 43, by way of the polar contact caps 25 and such off-center contacts engaged with them. The circuit through the motor will be such that it will rotate in the sense to swing casing 1 with respect to ring 34 in a direction to move the engaging off-center contacts 5 off the polar contact caps 25. This movement also causes a follow-up action of the casing relative to gyroscope sphere 2 toward centered position.

If the movement of ring 34 relative to the gyroscope had been in the opposite sense, as shown in Figure 14, a circuit would have been completed through motor 43 by way of the other pair of diametrically opposite contacts 5 in the same plane. Electricity now flows through the same motor in the opposite direction, so that it will move the casing reversely, again to center it with respect to ball 2. If the tilting tendency occurs in a plane perpendicular to that in which tilting was first assumed, motor 45, instead of motor 43, will be driven in one direction or the other with a similar follow-up action. When the casing diameter substantially coincident with the gyroscope spin axis swings about pivots 40 past coincidence with pivots 41 the circuit of motor 45 is reversed automatically through split commutator rings concentric with pivots 40, as shown in Fig. 12, to effect follow-up movement of the casing in the proper sense. Thus tilting of the casing 1 relative to its support about the axis of pivots 40, or the axis of pivots 41, or both, to maintain its relationship to the gyroscope unit 2 substantially constant, will reflect any change in angle between such unit and the support, and may be translated into indications of latitude and longitude change.

Actually slight inaccuracies in manufacture and friction between the parts would tend to render a pure follow-up action, as described, somewhat inaccurate, in view of the slow speed at which any progressive angular change between the gyroscope ball and a horizontal plane would occur. In order to eliminate such inaccuracies, after the first contact has been made to initiate operation of either motor 43 or 45, that motor would overrun sufficiently to effect contact of caps 25 with the opposite off-center contacts 5, which are in reverse circuit with the motor, so that the same motor would immediately rotate oppositely to tilt the sphere back again, and it would again overrun. The casing 1 is thus continually rocked with respect to the sphere 2 in substantially simple harmonic motion between relative positions such as indicated in Figures 13 and 14, by the follow up motor alternately reversing. More probably the casing will be rocked by both follow up motors 43 and 45 about both pivots 40 and 41 in a wobbling fashion substantially of a compound or complex harmonic type. In either case the range of tilt will only be through 2 or 3 degrees, and the casing will oscillate through 2 or 3 complete cycles each second. The parts will thus be kept in a constant state of animation so that frictional forces will be neutralized and all lag in registry of progression of ring 34 relative to the gyroscope will be eliminated.

As has been stated previously, the change in the angular relationship of the local horizontal plane relative to the gyroscope axis, reflected in the described follow-up movement of casing 1 relative to ring 34 about the axes of pivots 40 and 41, bears a definite relationship to latitude and longitude changes in the location of the gyroscopic device on the earth's surface, provided that the yoke 31 is kept properly oriented. An indication or record of latitude or longitude progress may therefore be obtained by measurement of the casing movement about these axes of pivots 40 and 41. It is difficult to make such measurements directly, especially because of the sustained oscillatory motion of casing 1, and, therefore, suitable mechanism for transmitting such motion to indicating or computing apparatus, and for damping such oscillations, such as disclosed in my above mentioned copending applications, may be provided. Such movement may be transmitted to several receivers by a single transmitter, for example to latitude and longitude degree indicators, to a globe course recorder, and to a chart plotter, all at the same time, instead of to only one of these instruments. This transmitting mechanism may take the form of self-synchronous motor systems, or of step-by-step transmitters, such, for example, as shown in Figure 12 of Young Patent No. 2,046,890. Any suitable type of repeater system may be employed, the transmitter 46 for one such system being actuated by rotation of the casing 1 about the axis of pivots 40, and the repeater transmitter 47 being actuated by rotation of the casing 1 about pivots 41. In either instance a speed or movement step-up system of high value must be interposed between the transmitter and the casing suspension structure in order that the receiver may duplicate accurately the relatively small angular movement and slow progression of the casing relative to a horizontal plane. A corresponding speed reduction will be provided at the receiving end of the system.

Whatever type of repeater system is employed, I prefer that the indicating or recording mechanism driven thereby be synchronized with the position of casing 1 relative to ring 34, so that there will be a definite correspondence between the gyroscope unit and the indicating or recording mechanism. Thus, whether the device is operating or not, the indicating mechanism will show the attitude of casing 1 relative to its mount. In starting the gyroscope, if the correct position of the device, as ascertained by celestial observation, for example, is shown by the indicating mechanism it will be known that the casing 1 is positioned accurately for initiating operation of the gyroscope. On the other hand if the indicator's position does not correspond with the observed position, the indicating mechanism and the casing 1 may be moved conjointly until the proper orientation has been achieved. This is most conveniently accomplished through the operation of motors 43 and 45, driving both the casing and the transmitters, by actuation of manual pole changing switches 48 and 49, respectively, which for this purpose take the place of circuits completed through contacts 5.

When operation of my device is initiated, it is necessary not only to insure that the casing 1 is properly oriented, but in addition the gyroscope sphere 2 must occupy a position within the casing such that all the off-center contacts 5 are out of engagement with the conducting caps 25, for otherwise a conflict might occur between the electric circuit completed through a switch 48 or 49 and one through such contacts. To enable the casing 1 and ball 2 to be thus coordinated, I provide control reaction coils in the casing and in the ball, utilizing the phenomenon that two parallel coils will be attracted to each other if current is flowing through them in the same direction, and will be repelled if the currents flow in opposed directions. While the number and arrangement of these may be varied, that shown diagrammatically in Figure 11 is the one which I prefer. One set of coplanar segmental coils 70 and 71, and a second set of similar coplanar segmental coils 72 and 73, lie in peripheral grooves formed in casing 1, which define parallel planes spaced equally on opposite sides of the equatorial plane of the casing. Current through these coils is controlled by a master switch 7 which also controls current through pole changing switches 48 and 49 to motors 43 and 45 by which casing 1 is oriented.

Cooperating with segmental coils 70 and 71 is an annular coil 74 mounted within ball 2, and a similar coil 75 cooperating with segmental coils 72 and 73. These coils within the ball are parallel, be in planes perpendicular to the spin axis, and are spaced apart a distance corresponding generally to the spacing of the casing coils, as shown in Figure 2. If the currents within the sphere coils flow in opposite directions, as shown by the arrows in Figure 11, and current flows through the other coils as indicated by the solid arrows, and they are positioned relatively in the manner shown, the coils 74 and 75 will be attracted to the inner arcs of coils 70, 71, and 72, 73, respectively. The outer arcs detract from, rather than supplement, the inner arcs of these coils, so that such portions may be made of any desired shape to minimize such effect as far as possible, as long as they are made similar and symmetrical, to balance the opposed coil structures both electrically and gravitationally. Coils 74 and 75, thus reacting, will carry with them the sphere 2 whatever position it assumed originally, so that it will be brought into a position wherein its spin axis is perpendicular to the equatorial plane of casing 1.

Additional coils 76 and 77 may be provided in the casing and ball 2, respectively, located in planes perpendicular to the planes of the reaction coils described above, coil 77 therefore being parallel to or including the gyroscope spin axis. Coil 76 is divided at opposite sides of the casing 2 to pass around the central contact members 5, and crosses the equatorial region of the casing at locations spaced circumferentially from the photo-sensitive devices 67 so as not to interfere with their action. When these two coils are energized with currents passing in the directions indicated by the arrows, the ball 2 will be rotated with coil 77 by the attraction of coil 76 until the two are coplaner.

It will be seen that the sphere has now been placed in a definite and predetermined relationship to the casing 1, and it may be held in this position against ordinary displacing forces simply by keeping the coils energized. Preferably, however, the sphere and casing may be locked positively in such relationship by projection of pins 11, extending through the casing, into sockets 12 located in the gyroscope ball 2 in corresponding positions. In order to prevent its movement in any manner relative to casing 1, at least three of these locking pins should be employed, and the pin arrangement may be balanced conveniently by using four such pins as shown best in Figure 3. These may be projected into their sockets simultaneously by operating solenoids 13, each encircling a pin. When it is desired to release this positive locking connection, springs 14 will return the pins when the current through their solenoids has been discontinued.

The procedure for placing my gyroscopic device in operation may now be followed in the consecutive order of the steps required. Coils 74, 75, and 77 within the gyroscope ball 2 are continually energized, as indicated by the wiring diagram of Figure 12. Switch 7 is closed to energize coils 70, 71, 72 and 73, and coil 76 is energized by closing its switch. Current will now flow through these several coils in the directions indicated by the solid arrows in Figure 11, so that the coils in the ball 2 will be attracted by the coils in the casing 1 and the ball will be centered within the casing in position for the locking pins 11 to be in registry with their sockets 12 in the surface of ball 2. Solenoids 13 will now be energized by closing their control switch to project the pins 11 into locking engagement with the sphere sockets.

With the sphere and casing thus held in neutral position, in which only the central contact balls 5 engage the cap plates 25, switches 42 and 48 are closed to complete a circuit in one direction or the other through motors 43 and 45, to drive the follow-up mechanism. By this operation the casing, with the sphere 2 locked within it, will be moved about its pivots 40 and 41 relative to ring 34 until the indicating or recording instruments register the position on the earth's surface at which operation of the device is to be initiated. When this position has been reached it is known that the casing and gyroscope are properly oriented in space. Current may then be supplied to the gyroscope motor to rotate rotor 23 and gyroscope rotor 20, the bolts 11 remaining in locked registry with ball sockets 12 until the gyroscope has come up to the desired speed. If the device is in correct equilibrium, operation may then be initiated by deenergizing coils 70, 71, 72, 73 and 76, and solenoids 13, if the correct time and place for commencement of operation has been reached.

Thus starting my device, the orientation of casing 1 relative to ring 34, and hence the setting of the indicators corresponding to such orientation, will depend upon the component or components which the device is to measure. If the casing 1 is oriented so that the spin axis of the gyroscope is parallel to the rotative axis of the earth, a change in angular relationship to a horizontal plane should occur only when the latitude of the device's position changes, and would not be influenced by a change in its longitude, or by rotation of the earth upon its axis. With the yoke 31 maintained always in an east-west direction by a gyro-compass, therefore, the equatorial plane of casing 1 should always remain parallel to the plane of ring 4, within the limits of the oscillation between the opposed eccentric contacts 5 governing operation of motor 43.

As the latitude changes, however, ring 4 will be moved by motor 45 about pivots 41 to a greater or less extent relative to ring 34. The initial rotative position about this axis, therefore, will be established by setting the latitude indicator or recorder in the proper position by operation of motor 45, which will drive both the indicating mechanism, through the repeater transmitter 47, and casing 1, simultaneously. A second indicator should be provided to verify the absence of progressive rotation about pivots 40, which indicator will be driven by repeater transmitter 46. If this indicator should depart from neutral position, it will immediately call attention to the existence of a disturbing influence creating an error in the operation of the device, either a precession of the gyroscope spin axis out of the meridian plane or swinging of the yoke 31 out of its east and west direction, and the characteristics of such error may be ascertained from the extent and direction of the pointer's departure from neutral position.

If, on the other hand, the device is to be used to indicate longitude, casing 1 will be rotated about pivots 41 by motor 45 under the control of switch 49 as before, corresponding to the latitude of the gyroscope's position on the earth's surface, but in this instance ring 4 will be placed in a position such that the axis of pivots 40 is parallel to the rotative axis of the earth, instead of perpendicular to it. Motor 43 will now be operated by appropriate closing of switch 48 until the casing has been rotated about pivots 40 to dispose the spin axis of the gyroscope in the proper position with reference to the time and longitude of the device's position. Then, as in the case of the latitude gyroscopic device, the circuit through solenoids 13 will be broken for retraction of locking pins 11 from their sockets in ball 2, to initiate operation of the instrument.

Since, in the longitude instrument, the axis of pivots 40 is established parallel to the rotative axis of the earth, any departure of this axis relative to ring 34 will correspond to a change in latitude of the gyroscopic device. Consequently any progression of repeater transmitter 47 should correspond exactly to the departure from a horizontal plane of the latitude gyroscopic device. If an indicator is operated by element 47, therefore, a comparison of its movement with that of the latitude indicator or plotter will show whether the longitude gyroscopic device is operating properly and accurately.

The longitude indicating or plotting mechanism will be driven by the repeater transmitter 46 of the longitude gyroscopic device, which moves in synchronism with rotation of the casing about the pivots 40. Such movement is effected by motor 43 in response to a change in position of ring 34 relative to the gyroscopic device, caused by the diurnal rotation of the earth or a change in the longitude component of the device's position. Change of the gyroscope's position relative to a horizontal plane because of the earth's rotation will proceed always at the constant rate of a complete revolution every day, or an angular change of 15 degrees per hour. An increase in such rate of displacement denotes an eastward progression of the gyroscopic device over the earth's surface, and the extent of such increase is a measure of the speed of travel of the device. Conversely a decrease in such displacement rate denotes movement of the gyroscopic device along a westward course. Only the component of departure and speed in an exactly east or west direction affects such rotation about pivots 40, and the north or south component of the course is indicated by a change in tilt of the axis of these casing trunnions in the meridian plane. The accuracy of such rotation may be checked from time to time by comparison of the longitude indication with the longitude as ascertained by celestial observation.

If it should be found from the check system described above that one of the gyroscopic devices is not operating accurately, although its yoke 31 is correctly oriented in an east and west direction, such inaccuracy is probably caused by the presence of an unbalanced mass or force causing precession of the gyroscope. With my mechanism a counteracting force may be applied which will neutralize all torque forces tending to disturb the gyroscope device, thus to eliminate such error in its operation. All disturbing torques tending to cause precession of the gyroscope may be resolved into a single resultant torque acting about some axis perpendicular to the spin axis of the gyroscope. To prevent its precession, therefore, it is only necessary to create a torque equal in magnitude to the resultant upsetting torque and acting in the opposite direction about the same axis. Since precession of the gyroscope will occur about an axis perpendicular to the disturbing torque axis, and since the latter is known to be perpendicular to the spin axis of the gyroscope, the direction of the torque axis about which the correcting torque must act can be easily ascertained.

To overcome the disturbing torque, coils 70, 71, 72 and 73 may be rotated around the casing 1, always remaining perpendicular to the spin axis of the gyroscope. Suitable handles 19, shown in Figures 1 and 2, may be provided for this purpose, and the coils may be rotated conjointly until the gaps intervening between coplanar coils are aligned with the axis of the disturbing torque. Reversing switches 78 and 79, in the circuit of coils 71 and 72, respectively, may then be moved to reverse the direction of current flowing through these coils to that indicated by the broken arrows in Figure 11. Immediately a reaction occurs on coils 74 and 75 within the gyroscope ball 2, which creates a force couple exerting a torque on it. If the upper and lower casing coils have been placed in registry and aligned in the proper direction and sense, the precession will be halted and will proceed in the opposite direction. The coils may be left in this position until the gyroscope has precessed back to its proper spatial orientation. At that time, to prevent an opposite precessional error, the restoring torque must be reduced to a value which will be equal to the resultant disturbing torque. This may be accomplished by reducing the flow of current through coils 70, 71, 72 and 73, it being assumed that a constant current flows continuously through coils 74 and 75.

Instead of reducing the current flow, however, coils 70 and 71 may be rotated in one direction to move the intervening gaps out of the plane defined by the restoring torque axis and the spin axis of the gyroscope, while coils 72 and 73 are rotated in the opposite direction and to an equal extent relative to such plane, so that the coils will assume the positions shown in broken lines in Figure 11, for example. When the upper and lower coils are in registry the reaction with the coils in the sphere will either be a maximum or zero. If each coil were thus rotated through 90 degrees from a maximum torque registry the coils would again be in registry, but their effect upon coils 74 and 75 would be neutralized. If the coils are each rotated again through another 90 degrees into registry the reaction will again be maximum, but the torque effect upon coils 74 and 75 will be in the opposite sense, although about the same axis. Hence, the more the coils are rotated from such first position of registry, until they again move into registry, the smaller will be the restoring torque exerted upon the gyroscope ball 2. When the resultant upsetting torque has been exactly counteracted, the positions of the coils, or the current flowing through them, may be maintained continuously so that precession of the gyroscope will not occur thereafter. Such position of the coils need not be disturbed even for centering the gyroscope ball within the casing 1 to initiate operation of the device, for such centering will occur in any event merely by again reversing switches 78 and 79. If reversing switches are provided for all four coils, the proper application and intensity of the torque could be established for each instance by enabling the coils to be rotated through only 180 degrees. In the event some alteration should occur in the disturbing forces at some subsequent time, the current, or coil positions, or both, may be readjusted to restore the accuracy of the device.

It will also be seen that by the use of torque coils 70, 71, 72 and 73 reacting upon coils 74 and 75, the gyroscope may be precessed into a different spatial relationship and then the torque discontinued so that the indicating devices will be actuated with reference to such newly established position. If the mechanism should become too greatly out of proper orientation, or if it is to be reset to a considerably different spatial position, it would be preferable to stop the gyroscope, set it, and then start it again. To stop the rotor quickly a dynamic brake may be provided by shorting low resistances across the gyroscopic driving motor leads, as indicated in broken lines in Figure 12, and turning the motor as a generator by the rotative inertia of the gyroscope.

When separate gyroscopic devices are used for latitude and longitude, only the rotation about one axis is utilized for driving the course recording or position indicating mechanism. Theoretically, therefore, each gyroscope need be free to move only in one plane. Such plane in the case of the latitude gyroscope is a meridian plane, movement in it being about trunnions 41 when the yoke 31 is disposed in an east-west direction, and in the case of the longitude gyroscopic device, movement being in a plane parallel to the equator about pivots 40, the axis of such pivots being maintained parallel to the earth's axis. As previously mentioned, no tilting progression in an east-west direction should occur in the latitude gyroscope, and any tilt of the longitude gyroscope about the axis of pivots 41 should be caused only by a change in latitude. While it is preferred, as described above, that both gyroscopes be universally free it might be desirable, under some circumstances, not to employ the jet return mechanism, including the pump 61 and pump motor 64, valve 62, relay 66, photo-electric cells 67, and lights 68. In such instance, coil 76, which is disposed in a plane including the axis of pivots 40, and perpendicular to trunnions 41 would be energized continuously as well as coil 77, so that by their mutual attraction rotation of the gyroscope sphere 2 about the spin axis of the gyroscope by reaction of its rotation would be prevented.

With this arrangement in the latitude gyroscopic device, yoke 31, as previously mentioned, would be maintained in an east-west direction. Casing 1 would now rock unrestrictedly relative to ball 2 about pivots 41 by the action of motor 45, and any progression about this axis would correspond to a change in the latitude of position of the gyroscopic device.

The same expedient might be employed for the longitude gyroscopic device, in which instance the axis of journals 41 would be placed parallel to the spin axis of the earth, and it would be kept in this position, despite a change in latitude, by rotation of motor 43. Instead of being produced by oscillation of the casing 1, however, energization of this motor would be under the control of and it would move in accordance with movement of the latitude gyroscopic device, such as by mechanism 46 being a receiver synchronized with the transmitter of the latitude device actuated by a change in latitude, instead of its being a transmitter. By thus keeping the axis of pivots 41 always parallel to the rotative axis of the earth, the gyroscope would progress about these pivots always in a plane parallel to the earth's equatorial plane in the desired manner.

As in the case of the latitude gyroscopic device, while the casing 1 would continually rock about trunnions 41, the reaction of coils 76 and 77 would prevent retrograde rotation of the gyroscope ball 2 about the gyroscope's spin axis relative to casing 1. While such an arrangement would simplify the mechanism of my device, the restriction of movement of the gyroscope about one axis might tend to encourage precession about the axis of oscillation if the device were not in perfect balance, and such error would be more difficult to perceive because the checks afforded by comparison of two universally free gyroscopes, as described, would not be available.

In the modified construction of the gyroscopic device shown in Figures 15, 16 and 17, the sphere 2' itself acts as the gyroscope. As in the other types of devices, it is suspended in a fluid medium, preferably liquid. So that the ball may function as a gyroscope, it has a heavy rotor 27 located symmetrically about its equatorial plane, and which is centrally apertured for passage through it of wires within the ball connected to coils 74 and 75. These coils are similar to those in the forms earlier described, serving the same purpose and acting in the same manner. The gyroscope is spun, not by an electric motor, but by the jets 6 which, in this instance, operate continually. The driving fluid enters intake openings 60' arranged generally tangentially to the ball and in alignment with the nozzles 6, as shown in Figure 16, and passes thence to the pump 61. The force of the jets, and hence the speed at which the sphere rotates, as in the oscillatory type, may be regulated by a manual control valve not shown in the drawings. A switch controlling energization of pump motor 64 may be used to start and stop the gyroscope. Except for the manner of rotating the gyroscope rotor the operation is very similar to that of the first type described.

In the latter form the turbine buckets 24 will extend in a band completely about the ball, and the tube lights 68 and photo-electric cells 67 will be omitted. Because the ball rotates unidirectionally, a more adequate bearing arrangement is desirable, and I have provided two ball bearing rings 15 mounted in the inner wall 10 of the casing and engaging the top and bottom hemispheres of the gyroscope ball in the manner shown in Figure 16. These bearing rings of course, extend about the entire periphery of the sphere, as indicated in Figures 16 and 17. The annular zone 25' of the ball 2' which the balls of these ring bearings contact is preferably of metal, and hence may be used as an annular electrical contact zone for the follow-up motor contacts 5, while the polar cap plate will be of insulating material. In this instance the off-center contact members 5 will be located on a circle smaller than the peripheries of caps 26', so that opposite contacts within the same cluster cannot contact simultaneously with the annular conducting zone 25'. Centering of the gyroscope sphere 2' within casing 1 and precessing of the gyroscope may be effected and controlled by coils 70, 71, 72 and 73 in the casing, and coils 74 and 75 in the sphere, as in the other form. Because the ball itself spins, however, coils 76 and 77 are omitted, and positive locking pins are unnecessary.

Electric current must be supplied to the casing and the ball for driving and control purposes, and at least in the type of Figures 2 to 6, both direct and three-phase alternating current is desirable. On one side of the base post 32 five brushes 37 are mounted, two of which supply direct current and the other three three-phase alternating current. In addition, connections to the repeater devices are necessary. If a self-synchronous motor repeater system is employed, three interconnecting wires are required for each repeater system. Consequently on the other side of the post 32 six brushes 38 are provided, three of them being in circuit with the transmitter 46 and three in circuit with the transmitter 47. If a step-by-step system is employed, additional brushes may be required. On the yoke spindle 39 are mounted slip rings cooperating one with each brush 37 and 38, and insulated to provide separate circuits.

It is assumed that the various control switches will be mounted on yoke 31 or some other part of the mechanism, for otherwise additional switch circuits would require an increase in the number of brushes on support 32. In conjunction with each pivot axis a slip ring disc and brushes may be provided, shown generally in Figure 1, and in more detail in Figure 9. Because of the large number of circuits it is preferable to provide such an arrangement at each side of the several rings, and this arrangement also improves the balance of the mechanism, but the particular manner in which current is conducted to the operating parts according to the wiring diagrams of Figures 12 and 18 is functionally immaterial.

In the form of Figures 2 to 6, inclusive, both direct current and alternating current must be transmitted to the ball 2. Direct current is supplied by the central contact members 5 to the metal caps 26, and internal connections may be made to these caps, as indicated in Figure 12, to energize continuously lights 68 and coils 74, 75 and 77. Similarly direct current flows to coils 74 and 75 in ball 2' through conducting bands 25' from the ball bearing rings 15. In addition, three-phase alternating current is conducted to the ball 2 for the gyroscope motor by contact elements 5 engaging additional metal bands 28 encircling the central portion of the ball. These cannot include a band precisely about the equatorial region because this zone is occupied by the turbine buckets 24 and by the lights 68. Coils 70, 71, 72 and 73 are energized by trolley shoes engaging contact rings or tracks 16 in grooves encircling the casing adjacent to such coils, each groove having one track in the bottom and the other on one side.

It is desirable that the temperature remain uniform throughout casing 1 in order to prevent distortion and binding of the parts which might tend to cause precession of the gyroscope. The inner casing wall 10, which supports the contact members 5, coils 70, 71, 72, 73 and 76, and the photo-electric devices, will normally be spaced a substantial distance outward from the gyroscope sphere. The space between the casing shell and its inner wall 10, as well as the space within such inner wall, will be filled with liquid, and consequently such inner wall should be perforated, as indicated at 17, to provide free flow of the liquid throughout the entire casing. Such uniform temperature may fluctuate to some extent, causing expansion or contraction; and to accommodate a greater volume of liquid resulting from an increase in temperature blisters 18, partially filled with air, and preferably eight in number, project from different parts of the casing shell, such as shown in Figures 1 and 2. A small spout or nipple projects from the interior of the casing into each blister so that the air will not escape into the casing proper as the device turns over. As the liquid expands, more will be forced into these blisters and the gas within them will be compressed, but the change in liquid pressure will be negligible. The casing may conveniently be filled with liquid through one of these blisters, which is made removable, after the assembly has been completed, or it may be supplied to the intake of pump 61.

In the form of device shown in Figures 15, 16 and 17, only two holes 17' are provided, which are in axial alignment with the gyroscope spin axis. Through these the liquid may migrate between the space immediately surrounding the ball 2' and that on the outer side of wall 10. It is undesirable for this wall to be perforated in the region adjacent to the buckets 24 of the ball 2', for the liquid tending to flow through such holes at a high rate of speed would become very turbulent and create an excessive drag, resisting rotation of the ball. On the contrary, ribs 19, projecting inwardly from wall 10 and toward the turbine buckets 24, their inner edges lying close to the surface of ball 2', confine the turbulent liquid as far as possible to the bucket zone. The space between the sphere and inner casing wall should be great enough so that the drag of the fluid is slight, but any motion of the fluid other than perpendicular to the spin axis is damped out so as to avoid the possibility of setting up a torque which would cause precession of the gyroscope. The bearing rings 15 hold the ball sufficiently steady so that it cannot rub against these ribs or baffles.

What I claim as my invention is:

1. A gyroscopic navigational device comprising a gyroscope ball, a casing enclosing said ball and filled with liquid tending to buoy up said ball, means supporting said casing for tilting about a generally horizontal axis, a chamber filled partially with liquid and partially with gas, and means communicating with said casing, and opening into said chamber at a location to retain gas in said chamber in all tilted positions of said casing, said chamber operating by compression or expansion of the gas therein to maintain the casing liquid pressure substantially constant despite expansion or contraction of the liquid caused by a change in its temperature.

2. A gyroscopic navigational device comprising a gyroscope ball, a casing enclosing said ball and filled with liquid tending to buoy up said ball, means supporting said casing for tilting about a generally horizontal axis, a plurality of blisters on said casing, each filled partially with liquid and partially with gas, and each separated from said casing by an apertured wall, and a tube projecting from the aperture in each such wall into its blister, affording free communication with said casing but operable to retain gas in the blister in all tilted positions of said casing, said blisters operating by compression or expansion of the gas therein to maintain the casing liquid pressure substantially constant despite expansion or contraction of the liquid caused by a change in its temperature.

3. A gyroscopic navigational device comprising a gyroscope sphere, and a generally spherical casing housing said sphere and freely tiltable relative thereto, supporting means including a Cardan's suspension mount, a ring intermediate said mount and said casing, pivot means interconnecting said mount and said ring, second pivot means perpendicular to said first pivot means and interconnecting said ring and said casing, a gear train interengaged between said mount and said ring and associated with said first pivot means, a second gear train interengaged between said ring and said casing and associated with said second pivot means, a motor for each gear train operable to effect relative movement between the respective pivotally connected parts about the axis of the associated pivot means, and control means for said motors actuated by relative tilting of said gyroscope sphere and said casing to energize said motors for tilting said casing universally relative to said Cardan's suspension mount.

4. The gyroscopic navigational device defined in claim 3, in which the mutually perpendicular pivot means are substantially in the same plane, and the center of gravity of the casing and of the gyroscope sphere are also in such plane, and the pivot means interconnecting the Cardan's suspension mount and ring are below such mount to afford a pendulum effect.

5. The gyroscopic navigational device defined in claim 3, in which the casing is freely tiltable universally relative to the gyroscope sphere, and the motor control means for both motors include electric circuits having cooperating conducting surfaces and bearing ball contact members engageable with said conducting surfaces on the casing and gyroscope sphere respectively, to operate the motors automatically for tilting the casing relative to the Cardan's suspension mount at the same time and to substantially the same extent that such mount tilts relative to the gyroscope sphere.

6. A gyroscopic navigational device comprising a gyroscope sphere, a casing housing said gyroscope sphere and freely tiltable relative thereto, means operable to rotate said gyroscope sphere relative to said casing about the gyroscope axis, and magnetic reaction means associated with said gyroscope sphere and said casing and reacting therebetween, cooperable in all relative rotational relationships of said gyroscope sphere and said casing to exert a force on said gyroscope sphere tending to move said sphere to tilt its rotative axis relative to said casing.

7. A gyroscopic navigational device comprising a gyroscope sphere, a casing housing said gyroscope sphere, an electric coil carried by said casing substantially coplanar with the rotative axis of said gyroscope, and magnetic means movable with said gyroscope sphere and operable by interaction with the magnetic field of said casing coil, when energized, to rotate said casing and said gyroscope sphere relative to each other substantially about the rotative axis of the gyroscope.

8. A gyroscopic navigational device comprising a gyroscope, a casing housing said gyroscope, an electric coil movable with said gyroscope disposed in a plane intersecting the spin axis of the gyroscope, and a cooperating reaction coil carried by said casing, operable by interaction with said gyroscope coil, when said coils are energized, to tilt said casing relative to the spin axis of the gyroscope.

9. A gyroscopic navigational device comprising a gyroscope ball having a circular coil substantially in its surface, a casing housing said gyroscope ball and having an internal coil energizable to react with said ball coil when energized, for displacing said casing and gyroscope ball angularly relative to each other to dispose said coils in parallel relationship.

10. A gyroscopic navigational device comprising a ball, a gyroscope rotor mounted within said ball to spin about a diameter thereof as an axis, a coil substantially in the surface of said ball, a casing housing said ball, and a coil within said casing energizable to react with said first coil when energized, said coils being disposed respectively relative to said casing and ball to create interacting magnetic fields, when energized, operable to effect relative movement of said coils to rotate said casing and ball to establish a predetermined position relationship thereof, and thereby relatively substantially about the spin axis of said gyroscope rotor into a corresponding predetermined position relationship.

11. The gyroscopic navigational device of claim 10, and a second coil in the ball disposed transversely of the first ball coil, a second coil in the casing disposed transversely of the first casing coil, and said second ball and casing coils reacting when energized to move into parallelism, thus to tilt the casing and ball relative to each other about an axis at an angle to the spin axis of the gyroscope rotor into a definite predetermined relationship.

12. The gyroscopic navigational device of claim 10, and a second coil in the ball disposed transversely of the first ball coil, a second coil in the casing disposed transversely of the first casing coil, and said second ball and casing coils reacting when energized to move into parallelism, thus to tilt the casing and ball relative to each other about an axis at an angle to the spin axis of the gyroscope rotor into a definite predetermined relationship, and locking means operable thereafter to hold the ball and casing in such relationship.

13. A gyroscopic navigational device comprising a gyroscope, a casing housing said gyroscope and freely tiltable relative thereto, a coil encircling said gyroscope, and two coplanar segmental coils mounted on said casing and energizable to react with said gyroscope coil when energized for controlling the disposition of the gyroscope within said casing.

14. A gyroscopic navigational device comprising a gyroscope, a casing housing said gyroscope and freely tiltable relative thereto, a coil encircling said gyroscope, two coplanar segmental coils mounted on said casing, and means for energizing said two segmental coils simultaneously by current flowing through them in the same sense, by reaction with said gyroscope coil when energized to urge said casing and gyroscope coils toward parallelism, in turn effecting relative movement between said casing and said gyroscope to dispose them in a definite predetermined relationship.

15. A gyroscopic navigational device comprising a gyroscope, a casing housing said gyroscope and freely tiltable relative thereto, a coil encircling said gyroscope, two coplanar segmental coils mounted on said casing, and means for energizing said two segmental coils simultaneously by current flowing through them in opposite senses, by reaction with said gyroscope coil when energized to urge said casing and gyroscope coils away from parallelism, in turn creating a relative torque upon said casing and said gyroscope biasing them relatively away from the relationship assumed when said coils are parallel.

16. The gyroscopic navigational device of claim 15, and means for shifting the segmental casing coils conjointly circumferentially, thereby to change the axis about which the torque created by the interaction of the casing and gyroscope coils acts in biasing the casing and gyroscope.

17. A gyroscopic navigational device comprising a gyroscope, a generally spherical casing housing said gyroscope and freely tiltable relative thereto, a coil encircling said gyroscope, two coplanar segmental coils mounted on said casing, and means for energizing said two segmental coils simultaneously by current flowing through them in the same sense, by reaction with said gyroscope coil when energized to urge said casing and gyroscope coils toward parallelism, in turn effecting relative movement between said casing and said gyroscope to dispose them in a definite predetermined relationship, and said energizing means being further operable to reverse the direction of current through one of said casing coils, by reaction with said gyroscope coil when energized to urge said casing and gyroscope coils away from parallelism, in turn creating a relative torque upon said casing and said gyroscope biasing them relatively away from such predetermined relationship.

18. A gyroscopic navigational device comprising a gyroscope ball, annular coil means extending about the central portion of said ball substantially in its surface, a casing housing said ball, two pairs of segmental coils in said casing, the coils of each pair being disposed in coplanar relationship and the coil pairs being disposed on opposite sides of a central plane of said casing, means to energize said annular coil means and all said segmental coils, the current in the segmental coils of each pair flowing in opposite senses, by reaction between said segmental coils and said annular coil means to urge such coil means out of parallelism with said casing coils, thereby to exert a torque between said gyroscope ball and said casing, and means guiding at least one of said pairs of casing coils for rotative movement in its own plane about an axis perpendicular to such coils, for varying the reaction of said pairs of coils with said annular gyroscope coil means.

19. A gyroscopic navigational device comprising a gyroscope ball, annular coil means extending about the central portion of said ball substantially in its surface, a casing housing said ball, two pairs of segmental coils in said casing, the coils of each pair being disposed in coplanar relationship and the coil pairs being disposed on opposite sides of a central plane of said casing, means to energize said annular coil means and all said coils, the current in the segmental coils of each pair flowing in opposite senses, by reaction between said segmental coils and said annular coil means to urge such coil means out of parallelism with said casing coils, thereby to exert a torque between said gyroscope ball and said casing, and means guiding both pairs of casing coils for conjoint rotation about an axis perpendicular to such coils, for changing the direction of the axis about which such torque is exerted.

20. A gyroscopic navigational device comprising a gyroscope ball, annular coil means extending about the central portion of said ball substantially in its surface, a casing housing said ball, two pairs of segmental coils in said casing, the coils of each pair being disposed in coplanar relationship and the coil pairs being disposed on opposite sides of a central plane of said casing, means to energize said annular coil means and all said coils, the current in the segmental coils of each pair flowing in opposite senses, by reaction between said segmental coils and said annular coil means to urge such coil means out of parallelism with said casing coils, thereby to exert a torque between said gyroscope ball and said casing, and means guiding the casing coils of each pair for conjoint rotation about an axis perpendicular to such coils, one pair of casing coils being rotatable in one direction and the other pair in the opposite direction for varying their force of reaction upon said gyroscope unit coil means while maintaining constant the current through the casing coils and annular coil means.

21. A gyroscopic navigational device comprising a sphere, a gyroscope rotor mounted within said sphere to spin about an axis disposed diametrically thereof, an electric coil substantially in the surface of said sphere and disposed parallel to the spin axis of said gyroscope rotor, a casing housing said sphere, and a coil in said housing energizable to react with said sphere coil when energized to urge said casing and sphere coils toward parallelism, for establishing a predetermined relative disposition of said casing and sphere wherein said two coils are parallel.

22. A navigational gyroscopic device comprising a gyroscope, a casing housing said gyroscope and normally freely tiltable relative thereto, means cooperable between said casing and said gyroscope for holding them in a definite predetermined relationship, supporting means, means interengaged between said casing and said supporting means operable to restrain relative tilting movement thereof, and manual control means operable at will to overcome the restraining effect of said interengaged means and to tilt said casing and gyroscope relative to said supporting means while said casing and gyroscope are maintained in relatively unvarying relationship to each other by said means cooperable therebetween.

23. The gyroscopic navigational device of claim 22, and additional control means operated automatically by tilting of the supporting means relative to the gyroscope, when the cooperable means are inoperative, to overcome the restraining effect of the interengaged means and to tilt the casing relative to the supporting means through an angle substantially equal to the tilt of the supporting means relative to the gyroscope, thereby to restore and to maintain substantially constant the relationship between the casing and the gyroscope when the cooperable means are inoperative.

24. A navigational gyroscopic device comprising a gyroscope, a casing housing said gyroscope and normally freely tiltable relative thereto, cooperating coil means associated with said gyroscope and said casing coacting when energized to maintain them in a definite predetermined relationship, supporting means, means interengaged between said casing and said supporting means operable to restrain relative tilting movement thereof, and manual control means operable at will to overcome the restraining effect of said interengaged means and to tilt said casing and gyroscope relative to said supporting means while said casing and gyroscope are maintained in relatively unvarying relationship to each other by said coacting coil means.

25. A navigational gyroscopic device comprising a gyroscope sphere, a casing housing said sphere and normally freely tiltable relative thereto, means cooperable between said casing and said sphere for holding them in a definite predetermined relationship, supporting means, means interengaged between said casing and said supporting means operable to restrain relative tilting movement thereof, including a gear train interengaged therebetween, motor means operable to rotate said gear train, and motor control means manually operable at will to energize said motor means, thus to rotate said interengaged gear train for tilting said casing and sphere relative to said supporting means while held in fixed relationship to each other by said means cooperable therebetween, thereby to dispose said sphere and casing in a desired spatial relationship when said supporting means is in a known relationship to the earth's surface.

26. The gyroscopic navigational device of claim 25, and additional motor control means actuated automatically by tilting of the supporting means relative to the gyroscope sphere, when the cooperable means are inoperative, to energize the motor means, thus to rotate the interengaged gear train for tilting the casing relative to the supporting means through an angle substantially equal to the tilt of the supporting means relative to the gyroscope sphere, thereby to maintain the casing and gyroscope sphere in substantially constant relationship when the cooperable means are inoperative.

27. A navigational gyroscopic device comprising a gyroscope sphere, a casing housing said sphere and normally freely tiltable relative thereto, cooperating coil means on said sphere and said casing coacting when energized to maintain them in a definite predetermined relationship, means supporting said casing, means interengaged between said casing and said supporting means operable to restrain relative tilting movement thereof, including a gear train interengaged therebetween, motor means operable to rotate said gear train, and motor control means, manually operable at will only when said cooperating coil means are energized, to energize said motor means, thus to rotate said interengaged gear train for tilting said casing and sphere relative to said supporting means while held in fixed relationship to each other by said coacting coil means, thereby to dispose said sphere and casing in a desired spatial relationship when said supporting means is in a known relationship to the earth's surface.

28. A gyroscopic navigational device comprising a gyroscope sphere, a casing housing said sphere and normally freely tiltable relative thereto, a circular coil substantially in the surface of said gyroscope sphere, a cooperating coil in said casing, said coils reacting when energized to move into parallelism, thus to dispose and maintain said sphere and casing in a definite predetermined relationship, supporting means, pivot means interconnecting said casing and said supporting means, a gear train interengaged between said supporting means and said casing, and operable to restrain relative tilting movement thereof about the axis of said pivot means, motor means operable to rotate said gear train, reversible manual motor control means, operable at will only when said sphere and casing coils are energized, to energize said motor means, thus to rotate said interengaged gear train for tilting said casing and sphere relative to said supporting means about said pivot means while held in fixed relationship to each other by said cooperating sphere and casing coils, thereby to dispose said sphere and casing in a desired spatial relationship with said supporting means in a known relationship to the earth's surface, and automatic motor control means, operable by tilting of said supporting means relative to said gyroscope sphere only when said sphere and casing coils are deenergized, to energize said motor means, thus to rotate said interengaged gear train for tilting said casing relative to said supporting means through an angle substantially equal to the tilt of said supporting means relative to said gyroscope sphere, thereby to maintain said casing and gyroscope sphere in substantially constant relationship, said automatic control means including alternate electric circuits for reversing said motor and cooperating contacts for said circuits mounted respectively on said casing and on said gyroscope sphere, said contacts being arranged so that actuation of the motor by energization of one circuit will tilt the casing relative to the gyroscope sphere sufficiently to energize the other circuit, thereby to rock said casing continually relative to said gyroscope sphere through a small amplitude.

29. The gyroscope navigational device of claim 28, wherein the pivot means includes a ring, pivots interconnecting said ring and the supporting means, and pivots perpendicular to said first pivots interconnecting said ring and the casing, to afford universal tilting movement of the casing relative to the supporting means, two separate gear trains, one interengaged between the supporting means and said ring and the other between said ring and the casing, motor means operable to rotate each gear train, and both manual control means and automatic control means for each motor means, the casing normally being freely tiltable universally relative to the gyroscope sphere, and the cooperating contacts on the casing and gyroscope sphere for the two automatic control means being arranged so that actuation of each motor by energization of one of its circuits will tilt the casing relative to the gyroscope sphere sufficiently to energize the other circuit of such motor, thereby to rock the casing continually relative to the gyroscope sphere through a small amplitude in substantially compound harmonic motion.

30. A gyroscopic navigational device comprising a gyroscope ball, a gyroscope rotor within said ball, an axle carrying said rotor and journaled diametrically within said ball, means within said ball for spinning said gyroscope rotor relative to said ball, a casing housing said ball and supporting it for relative rotation of said casing and ball about the axis of said axle, and means inoperative to prevent turning of said ball relative to said casing about the axis of said axle through a substantial angle, but reacting between said ball and said casing for restraining continuous unidirectional relative rotation thereof about the axis of said axle under the influence of reaction to the force exerted by said rotor spinning means between said ball and said gyroscope rotor.

31. A gyroscopic navigational device comprising a gyroscope sphere, a casing housing said sphere and containing liquid buoying up said sphere, turbine buckets arranged about a great circle of said sphere, a nozzle carried by said casing directed toward the adjacent turbine buckets and substantially tangential to such great circle, means on said casing operable to project a liquid jet from said nozzle against said turbine buckets, thereby to rotate said sphere relative to said casing, and an outlet for liquid discharged by said nozzle disposed substantially in alignment with said nozzle to remove such liquid with the least disturbance of liquid in other portions of said casing.

32. A gyroscopic navigational device, comprising a gyroscope sphere, a casing housing said sphere, a nozzle carried by said casing and directed toward the sphere, means on said casing operable to project a fluid jet from said nozzle against said sphere, thereby to rotate it relative to said casing, and control means for said fluid projecting means controlling delivery of fluid from said nozzle to limit relative rotation of the gyroscope sphere and casing to less than a complete revolution.

33. The gyroscopic navigational device of claim 31, in which the casing is filled with fluid tending to buoy up the gyroscope sphere, the sphere itself constitutes a gyroscope rotor with the turbine buckets arranged in a band completely around it, the fluid delivery means are operable to project fluid continuously through the nozzle against the turbine buckets, and annular baffle ribs on the casing, at least one being located on each side of the sphere's great circle about which the turbine buckets are arranged, extending close to the sphere to confine the turbulent fluid projected from the nozzle to the region of the sphere's great circle around which the turbine buckets are arranged.

34. A gyroscopic navigational device comprising a hollow sphere, a gyroscope rotor mounted within said sphere to spin about a diameter thereof as an axis, means within said sphere operable to spin said gyroscope rotor, a casing housing said sphere, a partial band of turbine buckets disposed along a great circle of said sphere substantially perpendicular to the rotative axis of said gyroscope rotor, a nozzle carried by said casing directed toward the adjacent turbine buckets, means to supply fluid to said nozzle for projection therethrough against said turbine buckets, to rotate said sphere relative to said casing, photo-electric control means disposed for energization in a predetermined rotative position of said sphere relative to said casing, and means controlled by said photo-electric means governing operation of said fluid supply means to limit relative rotation of said casing and sphere effected by the nozzle jets to less than a complete revolution.

35. A gyroscopic navigational device comprising a hollow sphere, a gyroscope rotor mounted within said sphere to spin about a diameter thereof as an axis, means within said sphere operable to spin said gyroscope rotor, a casing housing said sphere, a partial band of turbine buckets disposed along a great circle of said sphere substantially perpendicular to the rotative axis of said gyroscope rotor, a light on said sphere adjacent to said partial band of turbine buckets, a nozzle carried by said casing directed toward the adjacent turbine buckets, means to supply fluid to said nozzle for projection therethrough against said turbine buckets, to rotate said sphere relative to said casing, a photo-electric device on said casing disposed for energization by said light in a predetermined rotative position of said sphere relative to said casing, and means controlled by said photo-electric device governing operation of said fluid supply means to limit relative rotation of said casing and sphere effected by the nozzle jets to less than a complete revolution.

36. A gyroscopic navigational device comprising a gyroscope sphere, a casing housing said sphere and freely tiltable relative thereto, turbine buckets arranged about a great circle of said sphere, a nozzle carried by said casing directed toward said turbine buckets and substantially tangential to such great circle, means on said casing operable to project a fluid jet from said nozzle against said turbine buckets, thereby to rotate said sphere relative to said casing, supporting means and tiltable relative to said gyroscope sphere, means interengaged between said casing and said supporting means operable to restrain relative tilting movement thereof, and control means operated automatically by tilting of said supporting means relative to said gyroscope sphere to overcome the restraining effect of said interengaged means, and to tilt said casing relative to said supporting means through an angle substantially equal to the tilt of said supporting means relative to said gyroscope sphere, thereby to restore substantially the relationship between said casing and said gyroscope sphere which existed prior to tilting of said supporting means relative to said sphere, and to maintain a substantially constant operative relationship between said casing nozzle and said sphere turbine buckets.

37. A gyroscopic navigational device comprising a hollow sphere, a gyroscope rotor mounted within said sphere to spin about a diameter thereof as an axis, means within said sphere operable to spin said gyroscope rotor, a casing housing said sphere and freely tiltable relative thereto, a partial band of turbine buckets disposed along a great circle of said sphere substantially perpendicular to the rotative axis of said gyroscope rotor, a light on said sphere adjacent to said partial band of turbine buckets, a nozzle carried by said casing directed toward said turbine buckets and substantially tangential to such great circle, means on said casing operable to supply fluid to said nozzle for projection through it against said turbine buckets to rotate said sphere relative to said casing, a photo-electric device on said casing disposed for energization by said light in a predetermined rotative position of said sphere relative to said casing, means controlled by said photo-electric device governing operation of said fluid supply means to limit relative rotation of said casing and sphere effected by the nozzle jet to less than a complete revolution, supporting means freely tiltable relative to said sphere, means interengaged between said casing and said supporting means operable to restrain relative tilting movement thereof, and control means operated automatically by tilting of said supporting means relative to said sphere to overcome the restraining effect of said interengaged means and to tilt said casing relative to said supporting means through an angle substantially equal to the tilt of said supporting means relative to said sphere, thereby to restore substantially the relationship between said casing and said sphere which existed prior to tilting of said supporting means relative to said sphere, and to maintain substantially constant the operative relationship between said casing nozzle and said turbine buckets on the sphere, and between said photo-electric device on said casing and said light in such predetermined rotative position of said sphere.

38. A gyroscopic navigational device comprising a gyroscope sphere, a casing housing said sphere and freely tiltable relative thereto, turbine buckets arranged about a great circle of said sphere, a nozzle carried by said casing and directed toward said turbine buckets and substantially tangential to such great circle, means on said casing operable to supply fluid to said nozzle for projection against said turbine buckets, thereby to rotate said sphere relative to said casing, supporting means freely tiltable relative to said gyroscope sphere, drive means interengaged between said supporting means and said casing, motor means operable to actuate said drive means, and motor control means actuated automatically by tilting of said supporting means relative to said gyroscope sphere to energize said motor, thus to actuate said drive means for tilting said casing relative to said supporting means to restore substantially the relationship between said casing and said gyroscope sphere which existed prior to tilting of said supporting means relative to said sphere, said control means including an electric circuit, a contact plate on said gyroscope sphere bearing a definite fixed relationship to said turbine buckets, and a contact carried by said casing bearing a fixed relationship to said nozzle, whereby such operation of said motor control means maintains a substantially constant cooperative relationship between said casing nozzle and said turbine buckets on said sphere.

MEREDITH JONES.